R. J. LANGER.
FEED TROUGH FOR ANIMAL PENS.
APPLICATION FILED OCT. 1, 1920.
1,413,410.
Patented Apr. 18, 1922.
2 SHEETS—SHEET 1.
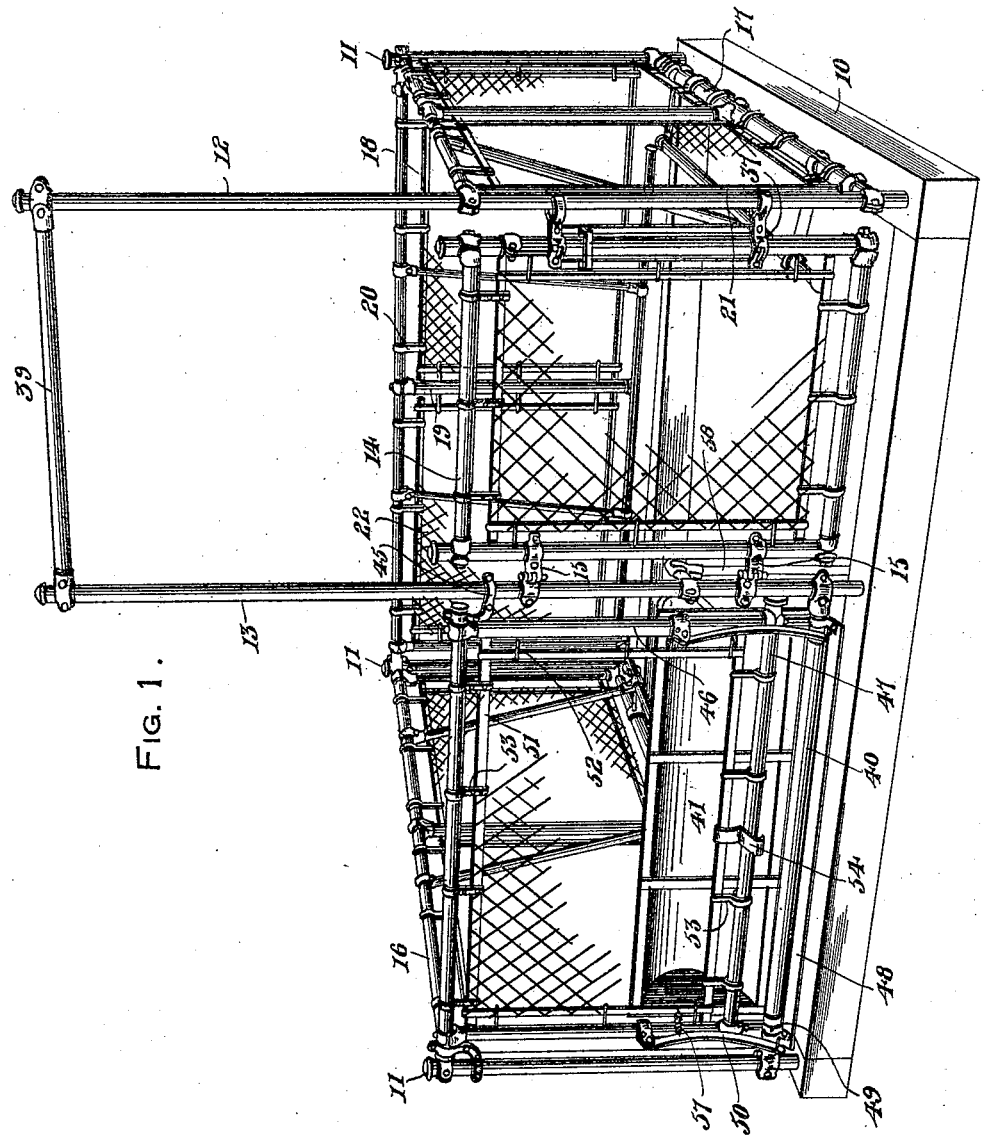
Inventor
R. J. Langer
By F. K. Bryant,
Attorney.

R. J. LANGER.
FEED TROUGH FOR ANIMAL PENS.
APPLICATION FILED OCT. 1, 1920.
1,413,410.  
Patented Apr. 18, 1922.  
2 SHEETS—SHEET 2.
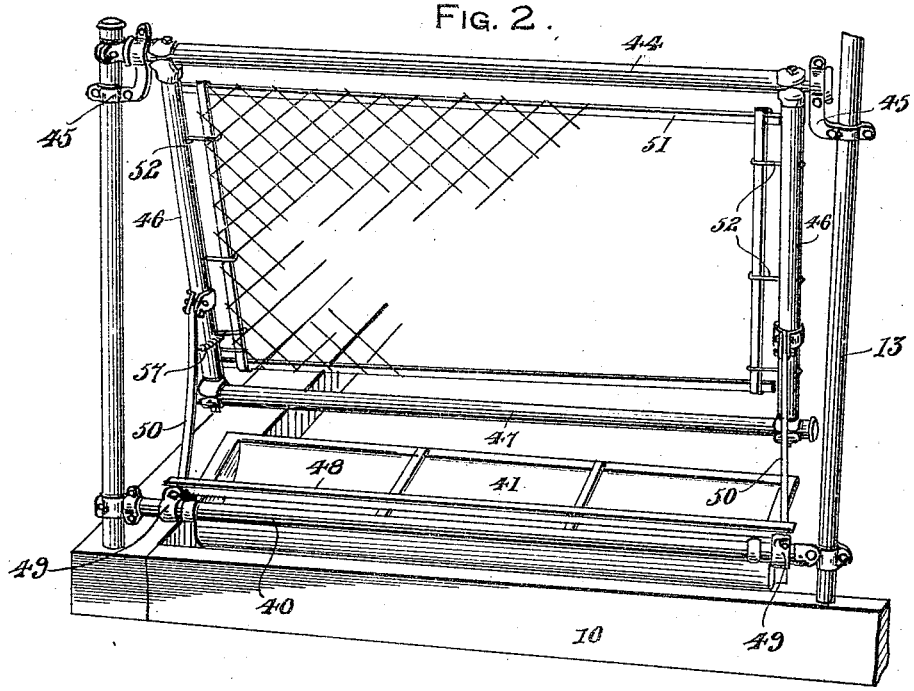
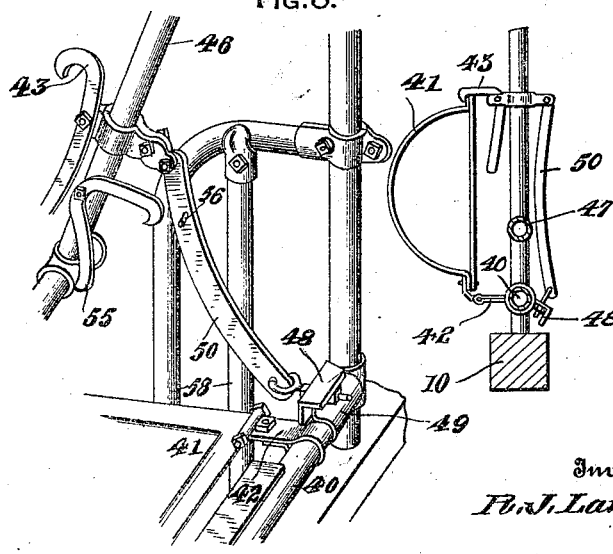

UNITED STATES PATENT OFFICE.

RUDOLPH J. LANGER, OF MONTICELLO, IOWA, ASSIGNOR TO FRANKLIN BARN EQUIPMENT CO., OF MONTICELLO, IOWA.

FEED TROUGH FOR ANIMAL PENS.

1,413,410.     Specification of Letters Patent.    Patented Apr. 18, 1922.

Application filed October 1, 1920. Serial No. 414,070.

*To all whom it may concern:*

Be it known that I, RUDOLPH J. LANGER, a citizen of the United States of America, residing at Monticello, in the county of Jones and State of Iowa, have invented certain new and useful Improvements in Feed Troughs for Animal Pens, of which the following is a specification.

The primary object of the invention is the provision of a metal pen adapted for easily feeding the animals without the necessity of entering the pen whereby the feeding operation may be accomplished by an attendant without a near approach to the animals in the pen.

A still further object is to provide a strong pen for animals having a movable side portion permitting the placing of feed within the pen and adapted for automatic locking in its normal closed position.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like designating characters refer to corresponding parts throughout the several views, Figure 1 is a perspective view of the feed trough and pen with the sides partly broken away, Figure 2 is a perspective view of a swinging panel in its open position to permit the feeding of stock, Figure 3 is a perspective view of a corner portion of the swinging panel, and Figure 4 is a view partly in section showing the feed trough in its inoperative elevated position.

Referring more in detail to the drawings, a rectangular curb or base 10 is provided having a rectangular fence mounted upon the curb with three corner posts 11 and a relatively higher post 12 at the fourth corner of the curb where the gate is located.

An upright post 13 spaced from the post 12 constitutes the mounting for the rectangular frame 14 of the gate connected by hinges 15 with the post 13. Upper and lower rails 16 and 17 are connected between the corner posts 11 and 12 for mounting sub frames 18 at the ends and side of the frame.

Connecting braces 19 are positioned centrally between the rails 16 and 17 while similar clamps 20 secure the sub frames 18 to the rails 16 and 17, braces 19 and similar end braces 21 carried between the rails 16 and 17 and adjacent the corner posts of the pen. Suitable wire mesh or grating 22 is provided for the sub frames 18.

The gate posts 12 and 13 are connected together adjacent the tops thereof by a cross piece 39 while a feeding device is provided for the pen between the post 13 and the adjacent corner post 11. A bottom rail 40 connects the gate post 13 and the adjacent corner post 11 together, and a feeding trough 41 is hinged to the rail 40 inwardly of the pen by means of brackets 42, permitting the trough to be swung upwardly against the adjacent side of the pen and retained in its inoperative position by means of a hook 43 as illustrated in Figures 1 and 4 of the drawings. Upon releasing the hook 43, the trough 41 is permitted to swing inwardly to a horizontal position when in the pen as shown in Figures 2 and 3 of the drawings. A swinging panel is provided between the fence post 13 and the adjacent corner post 11 comprising a top rail 44 trunnioned in brackets 45 secured to the gate post 13 and said adjacent corner post 11, end rails 46 for the panel being secured to the top rail 44 while a bottom rail 47 for the panel is opposite the said top rail thereof.

An operating board 48 is pivoted upon the rail 40 by means of collars 49 while links 50 pivotally connect the said collars 49 with the side rails 46 of the swinging panel, it being understood that when said panel is in its normally closed position, the links 50 are outwardly of the pen with the board 48 downwardly inclined with respect to the rail 40. A sub frame 51 is mounted by hook bolts 52 to the end rails 46 and also preferably connected by clamps 53 with the upper and lower rails 44 and 47. The swinging panel being trunnioned in the brackets 45, an inward push may be exerted upon the lower side thereof by placing the foot of the attendant upon the step 54 whereby the links 50 are moved inwardly of the lower rail 40 with the pivotal connections between the links 50 and the collars 49 being positioned inwardly of the axis of said lower rail 40 whereby the swinging panel is maintained with its lower rail 47 inwardly of the pen sufficiently to permit feed to be placed in the trough 41 without any interference on the part of the animals within the pen. By placing the foot upon the board 48, the lower ends of the links 50 are pulled outwardly of the lower rail 40 and the swinging panel moves to its normally closed position between the gate post 13, and adjacent corner post 11 and above the lower rail 40. An angular hook 55 pivoted to the side rail 46 automatically engages over a projecting pin 56 upon the adjacent link 50 holding the swinging panel closed until the hook 55 is manually released.

A spring 57 is connected in any convenient manner between one of the side rails 46 of the swinging frame and the adjacent link 50 assists the closing operation when the board 48 is moved outwardly or beyond the point of center of the lower rail 40. Protecting bars 58 are provided adjacent the inner end of the trough 41 being secured to the gate post 13.

The manner of using the pen and feed trough will be apparent from this detailed description thereof, the gate 14 being readily opened and closed at will by swinging the same outwardly for opening but normally retained in its closed position by any preferred form of latch mechanism. The trough 41 is normally in its horizontal position upon the floor of the pen for feeding purposes while access thereto is readily obtained upon releasing the hook 55 by swinging the moving panel at the front side of the pen inwardly and after depositing the feed in the trough 41, again returning the swinging panel to its closed position retained by the hook 55.

Having thus described my invention, what I claim as new and desire to secure by Letters Patent, is:—

1. In a feeding pen having spaced posts, a top rail trunnioned between said posts, a swinging frame carried by the top rail, curved links pivotally mounted upon the frame, collar members upon the ends of said lower rail, eye bolt connections for said collars and links, and a foot-board mounted upon the collars for swinging the panel to a closed position.

2. In a feeding pen having spaced posts, a top rail trunnioned between said posts, a lower rail secured between said posts, a swinging frame carried by the top rail, collar and link connections between the swinging frame and bottom rail adapted for maintaining the frame in its inwardly opened or outwardly closed positions at will, a foot-board connected between said link connections and a spring between the link connections and frame adapted for moving the latter to closed position and a feed trough inwardly of the pen pivoted to said lower rail.

In testimony whereof I affix my signature.

RUDOLPH J. LANGER.